April 18, 1933.  V. BELIZZI  1,903,752
AIRPLANE
Filed April 2, 1931  2 Sheets-Sheet 1
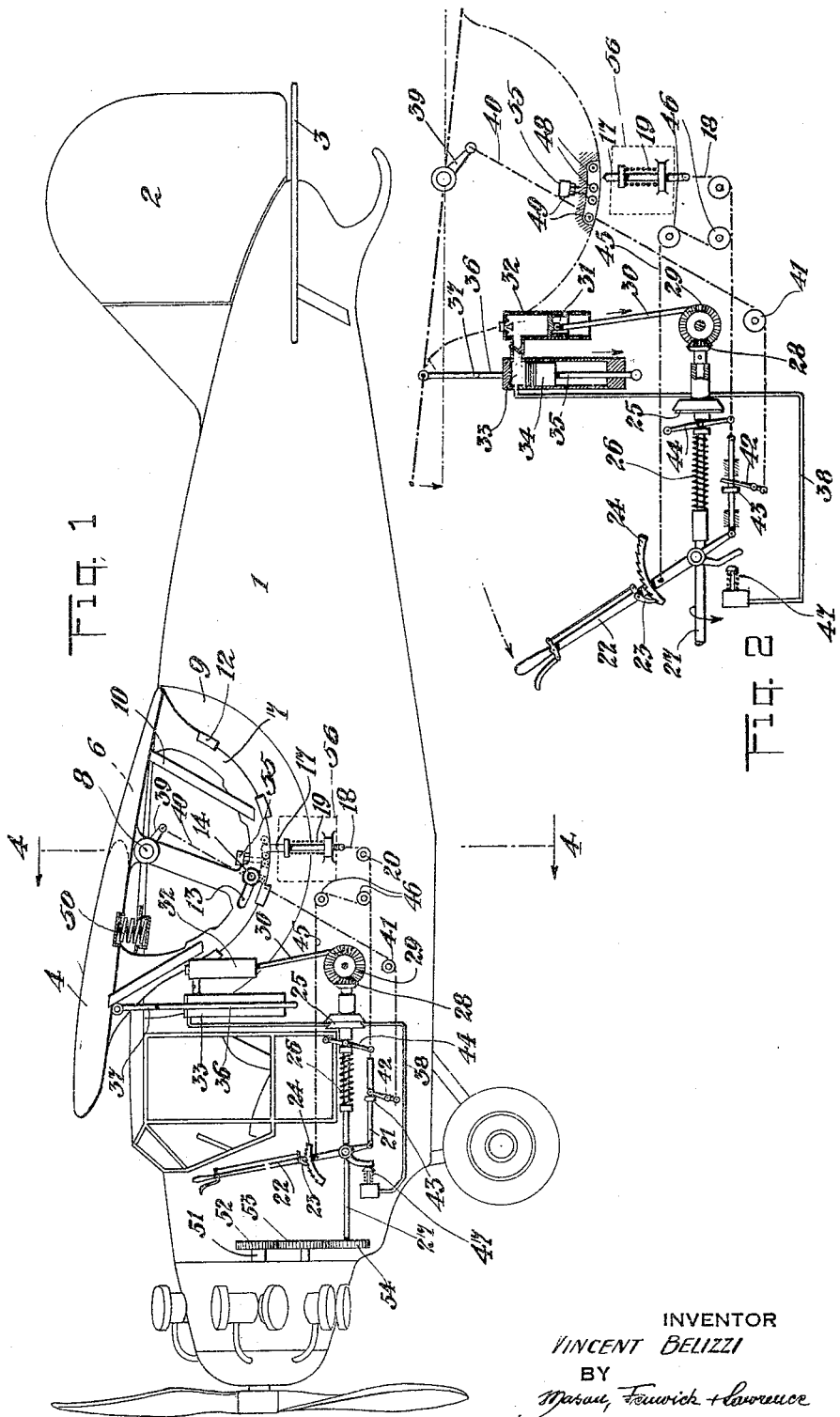
INVENTOR
VINCENT BELIZZI
BY
ATTORNEYS

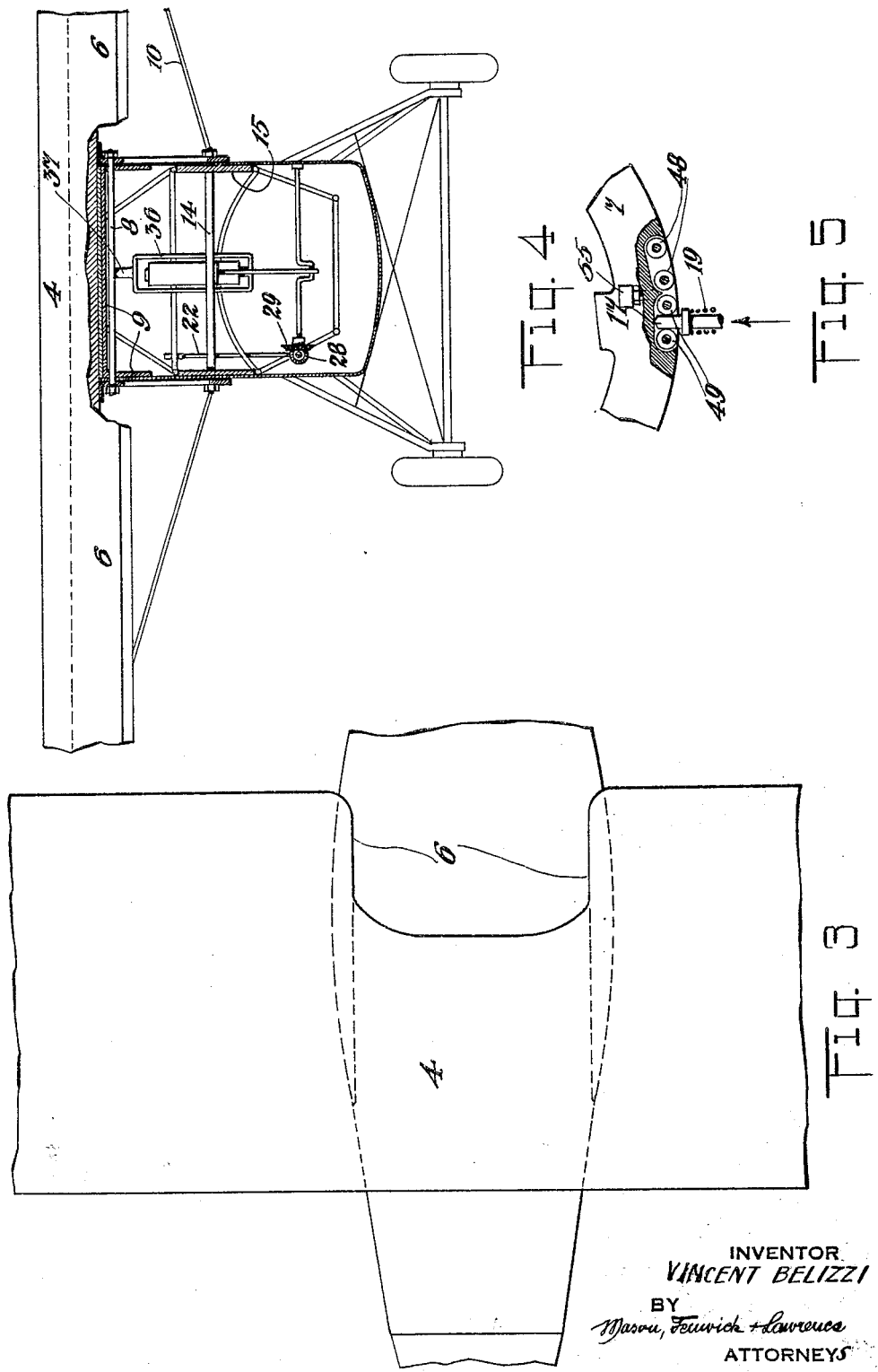

Patented Apr. 18, 1933

1,903,752

UNITED STATES PATENT OFFICE

VINCENT BELIZZI, OF BRONX, NEW YORK

AIRPLANE

Application filed April 2, 1931. Serial No. 527,287.

This invention relates to improvements in airplanes and has more particular relation to improvements in movable wings and means for operating the same.

One of the objects of the invention is to provide improved means for quickly moving the entire wing of a plane.

Another object of the invention is the moving and controlling of the wing of an airplane by the power of the engine and through the interposition of air devices.

A further object of the invention is to provide for the tilting or adjustment of the wings by power received from the engine.

The invention also has other objects, all of which will be hereinafter more particularly set forth and claimed.

In the accompanying drawings forming part of this specification,

Figure 1 represents a side elevation partly broken away of an airplane embodying my invention.

Figure 2 represents a diagrammatic detail side elevation of the wing controlling lever and power devices.

Figure 3 represents a top plan view, partly broken away, of the wings and fuselage.

Figure 4 represents a vertical section through the plane on the line 4—4 of Figure 1, the wings being partly broken away, and Figure 5 represents a detail side elevation partly in section of the locking devices for the wing segment.

Heretofore it has been the practice in constructing airplanes to have the wings fixed and set in relation to the fuselage so that the only way the wings could be tilted was by tilting the whole airplane at the same time.

Further, heretofore an attempt has been made to tilt the wings in relation to the fuselage by hand operated devices with multiplying gearing. This gearing would have been essential as the human strength is not sufficient to tilt the wings with the tremendous pressure against them that is present when the airplane is in flight.

This slowing down of the movement of the wing resulted in the re-adjustment of the wing being so slow as to be practically useless in connection with the rapid movement of a plane.

In the present invention, however, the applicant is utilizing the power of the engine and through the soft cushioning effect of an air pump and air cylinder is operating the wing positively and rapidly to adjust it to its different positions.

These adjusted positions of the wing may cover any range desired, but the most practical arrangement is a movement from the regular flying position from 10° to 15° further open. This, of course, tends in flying to elevate the nose of the ship and this action must be offset by corresponding movement of the horizontal stabilizer 3.

In landing, however, when the plane is resting on the ground, the wing can be tilted to its upper position and give extreme resistance to the air and cut down the speed of the plane without any adjustment of the horizontal stabilizers.

Further, for rapid climbing, the wing may be opened through part of its range or its whole range and the rapid climb counteracted by the horizontal stabilizer to prevent the plane going over in a loop.

Further, without the operation of the stabilizer, the complete opening of the wing while in the air will tend, at the right speed, to cause the plane to make a loop. Further, in case of accident, should the plane be making a nose dive, the opening of the wing will immediately bring the plane out of the dive and level off, and if not counteracted at that time, over into a loop.

The wing 4 which I prefer to use in connection with my invention, is of the monoplane type and is built as a single unit as shown in Figure 3, and is recessed as at 6, and is securely mounted on two segmental frames 7 that are pivoted on a strong anchoring bar 8, which as best shown in Fig. 4, is pivoted in a frame 9, this latter being securely anchored to the fuselage of the plane.

The wing braces 10 are secured at their upper ends to the wings, and at their lower ends to the segment plates. When the wing is tilted, the cut out portion 6 in the wing allows the two rear halves of the wing to pass down to each side of the fuselage. The wing is of course, provided near each end at the rear edge with an aileron.

The segments 7, operate over plates 11 and are held snugly in sliding contact therewith by angular lugs 12 secured to the plates 11. Each of the segments 7 is formed with a segmental slot 13. A strong rigid bar 14 passes through strengthening plates 15 of the fuselage and also through both the segmental slots 13, suitable nuts 16 being mounted on the ends of the bar to prevent the segments 7 jumping off the ends of the bar.

It will be seen from the above that the movement of the wing in both directions is limited by the rod 14 coming in contact with either one or the other of the ends of the slots 13.

The wing is locked or latched in either its lower or upper position by a spring pressed latching plunger 17. This plunger is retracted to unlock the segment 7 and allow the wing to be either closed or opened by the steel cable 18 connected to the end of the plunger 17 to retract it against its spring 19.

The cable 18 passes about a grooved wheel 20 and forward to join a rod 21, this rod being secured to the lower end of a lever 22 which is suitably pivoted in the frame of the fuselage. When the assembled parts are in the position shown in Fig. 2 with the wing open or raised and it is desired to close it, the lever 22 is pushed forward after its locking pawl 23 has been disengaged from the locking rack 24. This forward movement of the lever permits the cone friction clutch 25 to engage under the impulse of its spring 26 which surrounds the drive shaft 27 and thus operate the bevel pinion 28. This pinion, in turn, engages a bevel wheel 29 which actuates the pitman 30, this pitman being connected to the piston 31 of the air pump cylinder 32. This, because of gearing hereinafter described, causes the air pump to operate rapidly and to build up a pressure in the actuating cylinder 33 to force the piston 34 downward. This piston is provided with a rigid piston rod 35 which is connected at its lower end to a yoke frame 36, best shown in Fig. 4. This frame, in turn, is connected at its top by a strong rod 37 to a part of the main frame of the wing.

As shown in Fig. 2, when the lever 22 is in its forward position, the escape valve 47 connected by a pipe 38 to the upper part of the cylinder 33 is closed so that the air pump becomes effective to create a pressure in the cylinder 33.

As the wing is drawn closed or to its lower position by a down movement of the piston rod 35, an arm 39 connected to the shaft 8 is moved rearward and draws upon a cable 40 attached thereto. This cable passes down and about a grooved wheel 41 and forward to a small pivoted lever 42. This lever has its upper end slotted and engages a collar 43 on the rod 21; the rod 21 being connected to the lower end of the lever 22.

Thus, as the wing reaches its final closed position the drag on the cable 40 has caused the lever 42 to force the rod 21 towards the left. This will force the lever 22 back to the middle position on the rack segment 24, the pawl 23 in the meantime riding over the teeth of the rack.

The cable 18 is connected as before stated to the rod 21 and is also connected to a clutch shifting lever 44. When the closing of the wing causes the rod 21 to be moved to the left, the lever 44 will also be operated to disengage the clutch so that the power for closing the wing will be disconnected.

A cable 45 passing about two grooved wheels 46 is secured to the lever 22 above its pivot point and the opposite end of the cable is secured to the cable 18. When the lever 22 is forced into its forward position, it draws down on the lock bolt 17 and disengages it from the two rollers 48 mounted in the edge of the segment 7. As the wing closes the forcing of the lever 22 to the central position on the rack 24 takes up part of the slack in the cable 18 and the forward movement of the lever also releases the tension on the cable 45 and permits the bolt 17 to pass into locking engagement between rollers 49 also mounted on the edge of the segment 7.

The wing thus becomes locked firmly in its lower or closed position.

The office of the rollers 48 and 49 is to relieve the friction of unlocking the wing by the movement of the hand lever 22 as there is considerable pressure on the wing at such times as when it is to be unlocked, either from its open or closed position.

When the wing is to be opened, the lever 22 is pulled from its central position forward. This further disengages the clutch 25 and the continued forward movement of the lever by taking up all the slack in the cable 18 draws the bolt 17 downward to unlock the wing at the same time the valve 47 is operated so that as the piston 34, which is connected to the wing moves upward, the cylinder 33 acts as a buffer to restrain the opening of the wing, the air gradually escaping through the valve 47 and pipe 38 until the wing is fully opened. When it is fully opened the operator pushes forward slightly on the lever 22. This allows the bolt 17 to engage the rollers 48 and lock the wing in its open position.

The construction is such that while the pressure on the wing will open it very rapidly at first, the air will become so compressed in the cylinder 33 that the last part of the opening movement of the wing will be slowed down quite a bit, until the wing movement is limited by the rod 14 contacting with the ends of the slots 13. This would limit the opening of the wing, but as in some positions of the wing pressure may be on the top in some manoeuvres the wing is locked from return by the bolt 17 as above described so that it cannot accidentally close again.

The piston 34 operates to compress the air in the top of the cylinder 33 and at the same time to draw a vacuum in the lower part of the cylinder below the piston, all of which restrains the opening movement of the wing.

In order to give the wing its initial impulse to open, heavy coil springs 50 are arranged between the top of the fuselage and the under side of the wing to give it a slight forward movement when the pressure on it is not sufficient to start it.

In order that the shaft 27 may receive power from the engine, I connect the engine shaft 51 to a gear 52. This gear engages an idler gear 53 which in turn engages a gear 54 mounted on the end of the shaft 27.

It will be seen from the above that when the clutch is let in by the operator to connect the engine with the air pump, that the cable 45 disengages the bolt 17 from the wing and that the air pump immediately starts to build up a pressure in the operating cylinder 33. This rapidly draws the wing down to its lowermost position even though it is under pressure. The automatic throw-off of the clutch, however, prevents any damage being done to the wing as the arm 39, when the wing is closed, automatically disengages the clutch so that the parts will not be wrecked by the engine further operating the wing closing devices.

The fact that air actuation is now interposed between the clutch and the wing compensates for any slight mistiming of the parts or stretch of the cable 40 and allows the wing to be brought to its home position and latched without any shock or strain on any of the parts.

Suitable oil drip cups 55 are mounted on the segments 7 in proximity to the anti-friction rollers 48 and 49 to keep them always lubricated and thus assist in relieving the friction between the rollers and the bolt 17, as this friction is considerable because of the extreme pressure on the wing.

In order that the bolt 17 and its spring and supporting parts may be protected from rain, a shield 56, shown in dotted lines in Figs. 1 and 2, is formed over this bolt which, of course, comes on the outside of the sides of the fuselage. The cable 18 from the bolt 17 passes through a suitable aperture formed in the side of the fuselage to the mechanism located within.

It will be understood that the closing of an airplane wing, or pulling of it into position when under pressure, requires considerable force and that a human being is incapable of inserting this amount of force directly.

It will further be understood that in order to pull the wing closed through the power of the engine of the plane, it is necessary not only to couple the engine to an operating device for the wing, but to do this in such a way that no undue or sudden strain will be thrown on the engine such as might "stall" it just at a critical moment.

In the present application, this feature has been taken care of by providing devices which will couple up the rapidly moving motor to the wing operating devices so that a great leverage of power is the result. This leverage is so great that the slight retarding influence of the air pump in building up the extreme pressure necessary, does not exert sufficient drag upon the engine to run any particular danger of stalling it.

The pressure required is built up in the operating cylinder a bit at a time, but as the engine of the plane is operating at high speed, the necessary pressure is created in a very short time in a manner that is a practical insurance that the creating of such pressure will not "stall" the motor.

Such a result, of course, is impossible in any direct or mechanically connected devices between the engine and the wing without the employment of a large quantity of gearing such as would be impossible in an airplane that is limited to the weight it can carry.

I claim:

1. In an airplane, the combination with a fuselage, of a pivoted wing thereon, an engine for the plane, an air compressor connected to the engine, an air cylinder and piston, the piston connected to the wing, connections between the air compressor and the air cylinder and means for relieving the pressure in the air cylinder when the latter controls the opening of the wing.

2. In an airplane, the combination with a fuselage, of a movable wing mounted thereon, an engine, an air compressor, an air operated device connected directly to the wing and air operated means for controlling such device whereby it acts either as a motor or as a buffer to either close the wing or interpose a restraint to its opening.

3. In an airplane, the combination with a fuselage, of a pivoted wing thereon, an engine, an air compressor, and connections for drawing the wing down, a lock for the wing for holding it down, and connections for releasing the lock at will.

4. In an airplane, the combination with a fuselage, of a pivoted wing thereon, an engine for the plane, an air compressor, an air cylinder and piston connected to the compressor, a clutch between the compressor and the engine, means for operating the clutch, a latch for the wing for locking it both open and closed, and means for operating the latch from the clutch shifting devices.

5. In an airplane, the combination with a fuselage, of a pivoted wing thereon, an engine for the plane, an air compressor, means for connecting the air compressor to the engine at will, an air cylinder and piston connected to the compressor, means connecting the piston to the wing, and means for opening an escape of air from the cylinder whereby it acts as a buffer when the wing is opening.

In testimony whereof I affix my signature.

VINCENT BELIZZI.